Patented July 27, 1926.

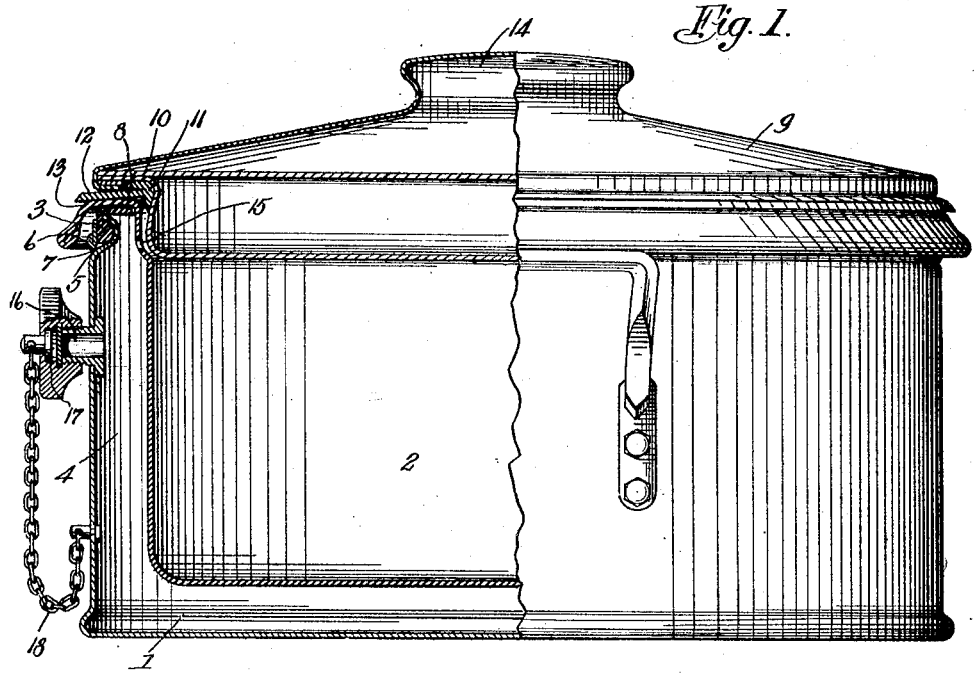

1,593,650

UNITED STATES PATENT OFFICE.

CHARLES E. BULTMAN, OF CHICAGO, ILLINOIS, ASSIGNOR TO THE MANTLE LAMP COMPANY OF AMERICA, OF CHICAGO, ILLINOIS, A CORPORATION OF ILLINOIS.

HEAT-INSULATED COOKING AND SERVING DISH.

Application filed June 26, 1922. Serial No. 570,872.

The invention comprehends certain features of construction relating to jacketed heat-insulated food-serving receptacles, in which cooked food products may be kept hot for considerable periods of time; and it has especial reference to receptacles of this type wherein the inner vessel, which is a food container, may be removed and used as an independent cooker, and, after the cooking is effectuated, replaced in the jacket of the receptacle wherein the heat of the food is conserved pending service at the table.

Heat-insulated receptacles are well-known means for maintaining the temperatures of hot and cold food products, but as heretofore constructed, these receptacles could not be used for food-cooking purposes, their heat-insulating devices preventing transmission of sufficient heat to the food.

Double-walled vessels are also well known as means for cooking food under qualified thermal conditions, but vessels of this description are not true or practical heat insulators, and are incapable of maintaining the desired high temperatures of cooked products for any considerable time. These cooking vessels include an outer shell for water, and an inner food container, water being employed as a means for avoiding the direct application of heat to the food in the container, and also to limit the temperature in the container to that of the vapor or steam rising from the water. The water space is not sealed, and hence the steam never attains the pressure which is a prerequisite to the elevation of its temperature.

Furthermore the functioning of these cooking vessels is not dependent upon means for conserving the heat of the cooked products, and cooling, after cooking, is a phenomenon with which the makers of these cooking vessels are unconcerned.

The essential constructions of all cooking vessels of the prior art, unfit them for use as heat retainers, the transmission of heat from the source to the food being through paths which aid, or do not materially retard the equalization of internal and external temperatures.

The prior art includes also a food receptacle in which there is placed a heat-storing mass of material which imparts its heat to the cooked food, but, in this receptacle, the maintenance of the temperature of the food is dependent not upon heat insulation, but upon the addition of heat increments transferred from the hot mass of the material to the food.

The invention, herein disclosed, is not intended to be and cannot be used as a substitute for a vacuum bottle, or a double-walled cooking vessel, or a cooking vessel having a heat-retaining mass of metal or fire brick, or even the so-called fireless cooker. The vacuum bottle has no removable single-walled container; the double-walled cooker is never employed as, and is not an efficient heat retainer; a cooking vessel associated with a large heat-retaining mass of material is not heat-insulated, and depends upon the transfer of heat units to, rather than upon heat insulation of the food; and the fireless cooker, while constituting a heat insulator is not a part of a heat-insulated food receptacle, but an independent device, in which a cooking vessel may be placed and retained, until a cooking operation initiated in a stove is completed.

The present invention includes not merely a cooking dish which may be used in the same manner as an ordinary cooking dish, but a co-operative outer jacket, heat-insulated from and constituting a part of the receptacle of which the cooking dish is also an element, said jacket and said cooking dish being separable and heat-insulated in such peculiar and effective manner, that cooked food may be kept hot for several hours after the cooking dish has been placed in the outer jacket. The entire device is relatively small, and the outer jacket is of such character that it may be used as a table article.

The invention will be best understood by referring to the accompanying drawing, in which—

Figure 1 is a view in elevation of a receptacle embodying the invention, parts being broken away to show in section the internal construction;

Figure 2 is an enlarged sectional fragmentary view of parts of the device shown in Figure 1;

Figure 3 is a view similar to that of Figure 2, the gasket carried by the cover of the receptacle being, however, shown in a position which is occupies before the cover is applied to the receptacle, and Figure 4 is a vertical sectional view showing certain modifications.

The jacket 1 may be made of metal, glass or porcelain, or other useful material, although, for purposes of heat insulation, a good heat-insulating material, such as glass, is advantageous. A metal, such as aluminum is, however, suitable, provided the container is so related to the jacket as to provide sufficient heat insulation.

The container or cooking insert 2 may be made of any material used in the manufacture of cooking vessels, and is sustained in the jacket by a flexible gasket 3, which may be rubber, operating to seal the joint between the two parts to thereby prevent the escape of air from the intervening space 4, as well as the admission of air to said space from the outside. The air, thus confined, will presently cool sufficiently to contract and establish a partial vacuum, enabling the superior outside pressure to depress the container and compress the gasket to thereby insure hermetical sealing. The gasket may be composed of any substance which will effectuate substantial sealing of the air space, and could be dispensed with if the contact between the jacket and the container were perfect. In view, however, of the cost and imperfections of workmanship, it is desirable to use a yieldable gasket which will adapt itself to irregularities in the contacting surfaces, rubber being preferred. Under proper conditions, a soft alloy might be used. The gasket, as shown, seats in a groove 5 in the jacket, and is held in place by a ring 6 which fits the shoulder 7 of said jacket, and extends inward over the edge of the jacket far enough to form a free flexible lip 8 affording a yielding line contact with the container when the container is inserted in the jacket. The lip 8 should be narrow to avoid buckling and to enable the container to fit the lip at all points of its circumference.

The cover 9 of the receptacle closes the container, and is formed with a groove 10 in which rests the inner edge of a gasket 11 which, like the gasket 3, is preferably made of rubber. The outer edge 12 of this gasket is quite thin and flexible, and is, therefore, capable of adapting itself to the rim 13 of the container to thereby hermetically seal the container. The cover is provided with a knob 14 by means of which it may be lifted.

The body of the container is provided with an orifice 15 for equalizing pressures within and without said vessel, and the jacket is provided with a vent 16 controlled by a valve 17, herein shown as a screw cap held captive by a chain 18. As long as this valve is closed, neither the cover 9 nor the container can be separated from the receptacle, but when said valve is opened the pressures in the container and the space around the container, will rise to atmospheric pressure, thereby permitting removal of these parts.

The cover is preferably heat insulated by a contained body of air which may exist under sub-normal pressure, or said cover may contain a vacuum.

From the foregoing description, it will be seen that hot food placed in the container, is heat insulated by the static body of air in which the container is submerged, by the heat-insulating gasket on which the container rests, and by the heat-insulated cover and its supporting gasket. The closure, therefore, of the several possible avenues of heat conduction, materially retards equalization of internal and external temperatures, the result being that cooked food may be served hot even if it has been kept in the container for several hours.

Figure 4 shows a receptacle which is devoid of a gasket between the jacket 1, and the container 2, the heat-insulation of this construction being afforded by the enveloping body of air and by the limited contact between the two elements. While this form of insulation is slightly inferior to that shown in the other figures of the drawing, it is entirely practical, and will be satisfactory in operation if the serving of the food is not too long delayed.

Having thus described my invention, I claim:

1. A heat-insulated serving dish including in combination a single-wall casing, adapted for table use, a removable, single wall and heat resisting cooking insert suspended in said casing, and a cover for said insert, said casing and said insert being separated at their sides and bottoms to afford space for a confined heat-insulating body of air.

2. A heat-insulated serving dish for table use including in combination a single wall casing adapted for table use, a removable and heat-resisting single wall cooking insert supported in said casing and having a hole in its wall, a cover for said insert, and a valve in said casing adapted when opened to admit air into said insert through said hole.

3. A serving dish for table use, a cover for said dish, a gasket encircling a part of the device and having a flexible margin disposed and extending outward between said dish and said cover whereby said gasket may be flexed and the cover slightly raised without admitting air to the interior of said dish.

4. A serving dish for table use, a cover for said dish, and a gasket disposed between said dish and said cover and having a flexible and relatively thin outwardly-extending margin whereby said gasket may be flexed and the cover slightly raised without admitting air to the interior of said dish.

5. A serving dish, a cover for said dish, a horizontal gasket encircling said cover and resting on said dish, said gasket having a thick inner portion and being flexible at its margin to admit of a substantial raising of the cover without admitting air to said vessel.

6. A receptacle including a removable insert, designed to act as an independent cooker, and a seal enabling said insert to hermetically fit said receptacle, said seal being an annular, yielding and attenuated body having a knife-like edge contacting with said insert.

7. A receptacle including an outer jacket having a groove, a gasket seated in said groove and having a flexible edge extending from said jacket, and a retaining ring for said gasket.

8. A receptacle including an outer jacket having a circumferential groove, a gasket extending from said groove and over the upper margin of said jacket, and a cooking insert resting on said gasket.

9. A serving dish including an outer jacket, a removable cooking insert and a cover, said jacket being provided with a controlled orifice, and said insert being provided with a permanent vent communicating with the space between said jacket and said dish.

In testimony whereof I affix my signature.

CHARLES E. BULTMAN.